United States Patent [19]
Suzuki

[11] Patent Number: 5,917,565
[45] Date of Patent: Jun. 29, 1999

[54] APPARATUS FOR INCREASING A POLARIZATION COMPONENT, LIGHT GUIDE UNIT, LIQUID CRYSTAL DISPLAY AND POLARIZATION METHOD

[75] Inventor: Masaru Suzuki, Yokohama, Japan

[73] Assignee: International Business Machines Corporation, Armonk, N.Y.

[21] Appl. No.: 08/608,245

[22] Filed: Feb. 28, 1996

[30] Foreign Application Priority Data

Feb. 28, 1995 [JP] Japan .................................. 7-040633

[51] Int. Cl.⁶ .......................... G02F 1/1335; G02B 6/00; G09F 13/04
[52] U.S. Cl. ................................ 349/65; 349/62; 349/96; 349/117; 362/31; 359/487; 385/146
[58] Field of Search ...................... 349/62, 64, 65, 349/96, 61, 113, 117; 359/487, 488, 494, 495, 498; 362/19, 26, 27, 31; 385/11, 130, 131, 146, 901

[56] References Cited

U.S. PATENT DOCUMENTS

| | | | |
|---|---|---|---|
| 4,798,448 | 1/1989 | van Rattle | 362/268 |
| 5,046,826 | 9/1991 | Iwamoto et al. | 349/65 |
| 5,157,526 | 10/1992 | Kondo et al. | 349/63 |
| 5,161,873 | 11/1992 | Obata et al. | 362/31 |
| 5,202,938 | 4/1993 | Man et al. | 385/11 |
| 5,390,276 | 2/1995 | Tai et al. | 385/901 |
| 5,528,720 | 6/1996 | Winston et al. | 385/146 |
| 5,546,481 | 8/1996 | Meltz et al. | 385/11 |
| 5,587,816 | 12/1996 | Gunjima et al. | 349/64 |
| 5,828,488 | 10/1998 | Ouderkurk et al. | 359/487 |

FOREIGN PATENT DOCUMENTS 6-265892   9/1994   Japan ........................ 349/64

*Primary Examiner*—William L. Sikes
*Assistant Examiner*—Tai V. Duong
*Attorney, Agent, or Firm*—Ronald L. Drumheller

[57] ABSTRACT

The efficiency of utilizing light for obtaining polarization is enhanced by making at least part of the polarized component available that has formerly been unused. Due to a mutual difference in reflection/transmission characteristic between the s-wave component and p-wave component, the reflected light 205 (s-wave ($x_1\%$), p-wave ($y_1\%$)) and the transmitted light 206 (s-wave ($x_2\%$), p-wave ($y_2\%$)) have the respective s-wave polarized and p-wave polarized components at a different ratio ($x_1 \neq x_2$, $y_1 \neq y_2$). By further changing the ratio of s-wave polarized and p-wave components by means 213 for changing the polarized direction of either the reflected light 205 or the transmitted light 206, and changing the course of light by means 212 for changing the traveling direction of light into such a direction as to enable both the reflected light 205 and the transmitted light 206 to be simultaneously utilized, light having a different ratio of s-wave and p-wave polarized components from that of the incident light 204 (s-wave ($x_0\%$), p-wave ($y_0\%$)) can be utilized.

4 Claims, 10 Drawing Sheets

APPARATUS FOR INCREASING A POLARIZATION COMPONENT, LIGHT GUIDE UNIT, LIQUID CRYSTAL DISPLAY AND POLARIZATION METHOD

BACKGROUND OF THE INVENTION

1. Field of the Invention

The invention refers to an apparatus and method for increasing the polarization components as well as a light guide unit and liquid crystal display by use thereof.

2. Related Art

Formerly, when obtaining a polarized light wave that means a light wave having polarization in polarized components, either s wave or p wave of polarized components has been absorbed by illuminating a ray of nonpolarized light to a polarizing plate. Consequently, in principle, more than 50% of illuminated light is not made effective use of and about 58% of illuminated light is absorbed in measured values. In a conventional liquid crystal display (LCD), not only a polarizing device (polarizing plate) for obtaining a polarized light by using the absorption of light but also a printing dot diffusing sheet is as a rule used, which makes further 20% of light not usable.

FIG. 15 shows LCD module 100 of a conventional LCD device. Since light generated in the light source 101 exhibits approx. 96% of transmittance in the light guide plate 102, approx. 80% of transmittance in the diffusing sheet 103, approx. 42% of transmittance in the lower polarizing plate 104, approx. 40% of array opening ratio in the glass base plate 105, approx. 30% of transmittance in the color filter 106, and approx. 90% of transmittance in the upper polarizing plate 107, the actually usable luminous intensity becomes 3.5% of the light generated in the light source 101, which smallness constitutes a large hindrance to an effective use of energy. Especially, in a portable personal computer, it is an important theme to secure a longer serviceable time for a fixed battery charging amount. Since a consumed power of the backlight 108 has a large proportion in the whole consumed power, a backlight system to be used in a high-brightness and low-power-consumption liquid crystal display (LCD) is eagerly desired.

A light energy absorbed in the lower polarizing plate 104 and the like comes to be converted into thermal energy and this generated heat becomes a factor for deteriorating parts of the LCD device. In particular, liquid crystals of STN (Super Twisted Nematic) type has a property of deterioration in indication quality due to heat and therefore it is also an important theme to reduce such generation of heat.

In this conversion of luminous energy into thermal energy, 66.4% of the luminous energy (69% of heat generation due to luminous energy) arises from the absorption of light in the lower polarizing plate 104 and diffusing sheet 103 as shown in FIG. 15.

Japanese Published Unexamined Patent Application No. 4-271324 shows one technique for enhancing an effective use of light, in which a light guide comprises a plurality of laminated refracting layers having different refractive indices and a decrease in optical packet is reduced by allowing a ray of light incident from a light incident end surface to be refracted on the boundary surface of each refractive layer and to reach the outgoing surface at a smaller angle than the critical angle, thereby promoting the light utilizing efficiency.

Also in Japanese Published Unexamined Patent Application No. 2-201316, the light utilizing efficiency of a light source is promoted by reducing the transmission of polarizing plate to once as a result of comprising a liquid crystal cell, a light guide plate disposed therebehind, a colored filter provided on the light guide plate, a reflecting-plate attached polarizing plate provided on the rear face side of the light guide plate, and a light source provided on the lateral face of the light guide plate.

However, either of these techniques is not different from the prior art described before in that no light comprising many polarized components is illuminated on the polarizing plate and a polarized light is obtained by absorbing either s wave or p wave, and does not enable at least a part of this absorbed and not-to-be-used component to be used.

Incidentally, some conventional backlight systems containing the order of 2.7% of polarized components are seen but these have no intention to polarize the light from a light source in the backlight.

As techniques for obtaining a polarized component by using characteristics of reflection or transmission without polarizing plate, there are a polarized beam splitter (PBS), transmission-type linear polarizer, and the like. Even though able to make use of only either s wave or p wave of light, or to make use of each separately, neither of these technique can make an effective use of both together.

Meanwhile, in a conventional transmission-type linear polarizer, because incident light is made to directly enter the polarizer at a Brewster's angle, it is impossible to diffuse a converged light onto a wide outgoing surface for outgoing. Furthermore, because a troublesome treatment is required for making the system thinner, no technique for obtaining a polarized light without using such a polarizing plate has so far been utilized for a light guide unit of the LCD device.

SUMMARY OF THE INVENTION

By making use of a polarized component that has formerly been absorbed in the polarized plate and converting this polarized component, the present invention enables at least part of the polarized component that has not formerly been made use of to be made use of and the light utilizing efficiency to be enhanced. And, an improved aspect of the present invention enables nearly 100% of light utilizing efficiency to be achieved and therefore can provide a backlight system (light guide unit) of low power consumption and high brightness.

Also, heat from the polarizing plate that has formerly been generated is reduced. Thus, the present invention can provide a backlight system (light guide unit) least likely to deteriorate in parts, coping with a thermolabile LCD device.

And, an improved aspect of the present invention enables a LCD device to be constructed without using a lower polarizing plate that has formerly been an essential constituent of the LCD device.

Furthermore, the present invention provides a light guide unit enabling a converged ray of light to diffuse onto a wide outgoing surface for outgoing, or a wide ray of light to outgo toward a converged outgoing surface and at the same time a constant polarized component to be obtained.

An apparatus for increasing polarized component in according to the present invention comprises: means for changing the polarization direction of either a ray of light reflected from or a ray of light transmitted through the boundary between two substances different in refractory index for incident light comprising a first and second polarized components; and means for changing the traveling direction of either said ray of light changed in the direction of polarity or the other ray of light into such a direction as to enable these rays of light to be used at the same time.

Means for changing the polarization direction of light includes phase plates for a change in phase, such as quarter wave plate and half wave plate, and optical rotators for rotating a plane of polarization, such as Faraday element, whereas means for changing the traveling direction of light includes a reflecting plate and prism sheet. And, means for changing the polarization direction of light and at the same time changing the traveling direction of light includes Fresnel's rhombic prism. Using all these is implied in the idea of the present invention. Furthermore, for a boundary between substances mutually different in refractive index, an existing polarizer, such as polarizing beam splitter or transmissive linear polarizer, is available. Thus, the present invention can be materialized by using an existing polarizer, means for changing the polarization direction of light and means for changing the traveling direction of light, or by using an existing polarizer and Fresnel's rhombic prism alone.

A light guide unit according to the present invention comprises: a main unit body consisting of a plurality of laminated light guides and having an outgoing surface on one side; a reflecting plate disposed on the other side of said main unit body; and means disposed between said main unit body and said reflecting plate for changing the polarization direction of light.

The plurality of light guides are laminated aslant the width direction of the main unit body.

The plurality of light guides are preferably material of low internal absorbency, such as acryl sheet, and preferably transmissive material, such as polycarbonate, polyethylene, Se and AgCl. The shape of a light guide is not limited to plate or sheet but can be modified to that conforming to applications, such as rod-like light guide or curved surface light guide. And, the plurality of light guides are not limited to the same shape or material, but can be thought to be so designed as thick for a member requiring strength and as thin for a member requiring no strength, or to increase in the number of laminated layers while maintaining the strength by depositing multiple layers of material different in refractive index on a light guide of high strength. When using acryl sheets as light guides, the width is preferably 0.1 to 4.0 mm from the standpoint of strength and light using efficiency.

Incidentally, lamination referred to as in the present invention is not limited to the insertion of air between the light guides, and implies the insertion of water or adhesive or other substances different in refractive index from a light guide for preventing the deterioration of a light guide due to invasion of moisture or the peeling of a light guide.

A reflecting plate according to the present invention is the more preferable if higher in reflectivity, and aluminum deposit sheet, silver deposit sheet, metal foil and the like can be made mention of as preferable.

A light guide unit according to the present invention comprises:
  a main unit body consisting of a plurality of laminated light guides and having an outgoing surface on one side; a reflecting plate disposed on the other side of said main unit body; and
  means disposed between said main unit body and said reflecting plate for changing the polarization direction of light. The plurality of light guides are laminated aslant the width direction of said main unit body and so arranged that a ray of light is incident toward the end of a reflecting plate side. A two-light backlight system with the light guide units disposed on both side also is implied in the idea of the present invention.

Incidentally, as will be mentioned later, the light utilizing efficiency improves if the end of said reflective plate side in the plurality of light guides is equally cut to a plane. In addition, this surface is preferably polished to promote the reflectivity.

An improved light guide unit according to the present invention enhances the light utilizing efficiency by converging the rays of light incident on the end of the reflecting plate side in parallel. Such means for converging a ray of light includes converging means by using a lens or convex mirror, or means by putting the end face for incident light in a light guide to a shape of convex lens, or means by combining these.

An improved light guide unit according to the present invention enhances the light utilizing efficiency by putting the outgoing surface of the main unit body comprising the end of a plurality of light guides into a stepwise shape including a surface parallel to the outgoing angle related to a particular polarized component outgoing from the outgoing surface.

An improved light guide unit according to the present invention enhances the light utilizing efficiency by putting the slant angle of light guides to an angle related to Brewster's angle.

An improved light guide unit according to the present invention enhances the light utilizing efficiency by correcting the direction of reflection from a reflecting plate. Such means are by slanting a reflecting plate, by changing the angle for outgoing, by using a Fresnel's rhombic prism, by using a prism sheet and so on. As for slanting this reflecting plate, putting the reflecting plate into a stepwise shape is also considered for space-saving. Furthermore, for suppressing the reflectance at reentering the light guides it is also considered to vary the traveling direction of light stepwise by laminating materials different in refractive index along the reflecting plate side of the main unit body. It is also possible to control the diffusion of light on the outgoing surface by using such a configuration.

An improved light guide unit according to the present invention enhances the usability by correcting the outgoing direction of light on the outgoing surface. Such means are by using a prism sheet, by machining a groove on the outgoing surface and so on. The usability is further enhanced by putting the shape of this prism sheet or the like into an angle related to a Brewster's angle.

A light guide unit according to the present invention includes a main unit body comprising a main unit body consisting of a plurality of laminated light guides and having an outgoing surface on one side, wherein the reflecting surface of plurality of light guides having the end adjacent to the outgoing surface in a shape cut to a plane.

The plurality of light guides are laminated at a slant angle related to a Brewster's angle to the width direction of said main unit body.

A light guide unit according to the present invention includes a main unit body comprising: a main unit body consisting of a plurality of laminated light guides and having an outgoing surface on one side; and a reflecting plate disposed on the other side of said main unit body.

The plurality of light guides is laminated at a slant angle related to a Brewster's angle to the width direction of said main unit body.

A light polarizing method according to the present invention comprises the steps of: allowing light comprising a first and second polarized components to enter the boundary between two substances mutually different in refractive index, a part of light to be reflected and another part of light to transmit; changing the polarization direction of said reflected light or said transmitted light; and changing the traveling direction of said reflected light or said transmitted light into such a direction as to enable both said reflected light and said transmitted light to be used at the same time.

A light polarizing method according to the present invention comprises the steps of: allowing light comprising a first and second polarized components to enter the surface adjacent to an outgoing surface of a main unit body consisting of a plurality of slant, laminated light guides and having an outgoing surface on one side; allowing light comprising a first and second polarized components to be reflected from the surface adjacent to said outgoing surface; allowing light containing more of a first polarized component having a first outgoing direction than a second polarized component to transmit and a part of light containing more of a second component than a first component to be reflected; allowing each ray of light containing more of said second polarized component partly reflected than a first polarized component to outgo from the main unit body; changing the polarization direction of light for each ray of light containing more of said second polarized component outgoing from said main unit body than a first polarized component; reflecting each of said rays of light changed in polarization direction; further changing the polarization direction of said rays of light changed and reflected into such rays of light as to contain more of a first polarized component having a second outgoing direction than a second polarized component; allowing each of said rays of light more of a first polarized component having a second outgoing direction than a second polarized component to enter said main unit body; and allowing each of said rays of light more of a first polarized component having a second outgoing direction than a second polarized component to transmit through said outgoing surface side end in each of said plurality of light guide.

A liquid crystal display according to the present invention comprises: a light source; glass base plates for sandwiching liquid crystals; and an upper polarizing plate; means for changing the polarization direction of either a ray of light reflected from or a ray of light transmitted through the boundary between two substances different in refractory index for incident light comprising a first and second polarized components; and means for changing the traveling direction of either said ray of light changed in the direction of polarity or the other ray of light into such a direction as to enable these rays of light to be used at the same time.

A liquid crystal display according to the present invention comprises: a light source; glass base plates for sandwiching liquid crystals; an upper polarizing plate; a main unit body consisting of a plurality of light guides laminated aslant the width direction thereof and having an outgoing surface on one side; a prism sheet disposed on the outgoing surface of said main unit body; a reflecting plate disposed on the other side of said main unit body; and means disposed between said main unit body and said reflecting plate for changing the polarization direction of light.

DESCRIPTION OF THE PREFERRED EMBODIMENTS

Here, the operating principle of the present invention will be described on the basis of FIGS. 1 and 2, but prior to this, to facilitate an understanding of operating principle, description will be made of what change occurs in polarized components when a ray of light transmits, refracts or is reflected on the boundary between two substances mutually different in refractive index by referring to FIGS. 16, 17 and 18.

Figure 16:
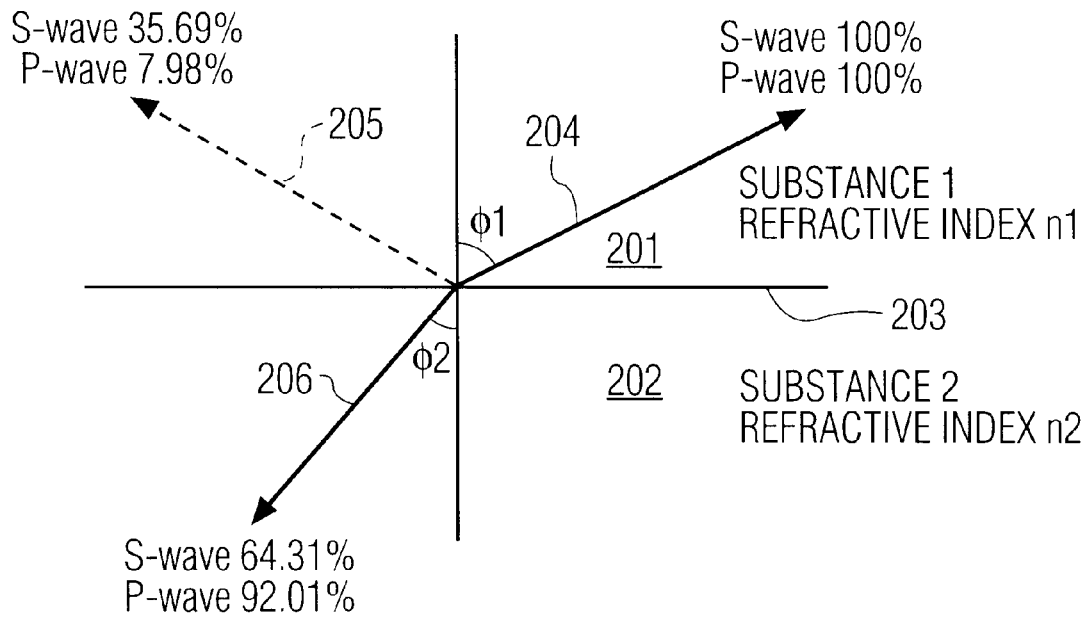
FIG. 16 is to illustrate the refraction of light between different substances.

In FIG. 16, when a ray of light 204 enters the boundary 203 between two substances 201 and 202 having the respective different refractive indices $n_1$ and $n_2$, some part of light 205 is reflected and other part of light 206 transmits if the incident angle $\phi_1$ is equal to or less than the critical angle. Here, if a plane formed by the incident light at the incident point to the boundary surface is taken as an incident plane, the polarized components of the incident light 204 can be divided into a p-wave component parallel to the incident plane and a s-wave component vertical to the incident plane.

By transforming a Maxwell equation concerning dielectrics, the transmittance of individual polarized components, p-wave and s-wave components, at this point is obtained as follows:

$$Tp = \sin(2\phi_1) \times \sin(2\phi_2)/(\sin^2(\phi_1+\phi_2) \times \cos^2(\phi_1-\phi_2))$$

$$Ts = \sin(2\phi_1) \times \sin(2\phi_2)/\sin^2(\phi_1+\phi_2)$$

$$n_1 \times \sin(\phi_1) = n_2 \times \sin(\phi_2),$$

where

Tp: transmittance for p-wave (1- reflectance Rp)
Ts: transmittance for s-wave (1- reflectance Rs)
$\phi_1$: incident angle of light
$\phi_2$: outgoing angle of light
$n_1$: refractive index of substance 201 before incidence
$n_2$: refractive index of substance 202 after incidence or $$Rp = (((n_1/\cos(\phi_1)) - (n_2/\cos(\phi_2)))/((n_1/\cos(\phi_1)) + (n_2/\cos(\phi_2))))^2$$

$$Rs = (((n_1/\cos(\phi_1)) - (n_2 \times \cos(\phi_2)))/(n_1 \times \cos(\phi_1)) + (n_2 \times \cos(\phi_2))))^2$$

Figure 17:
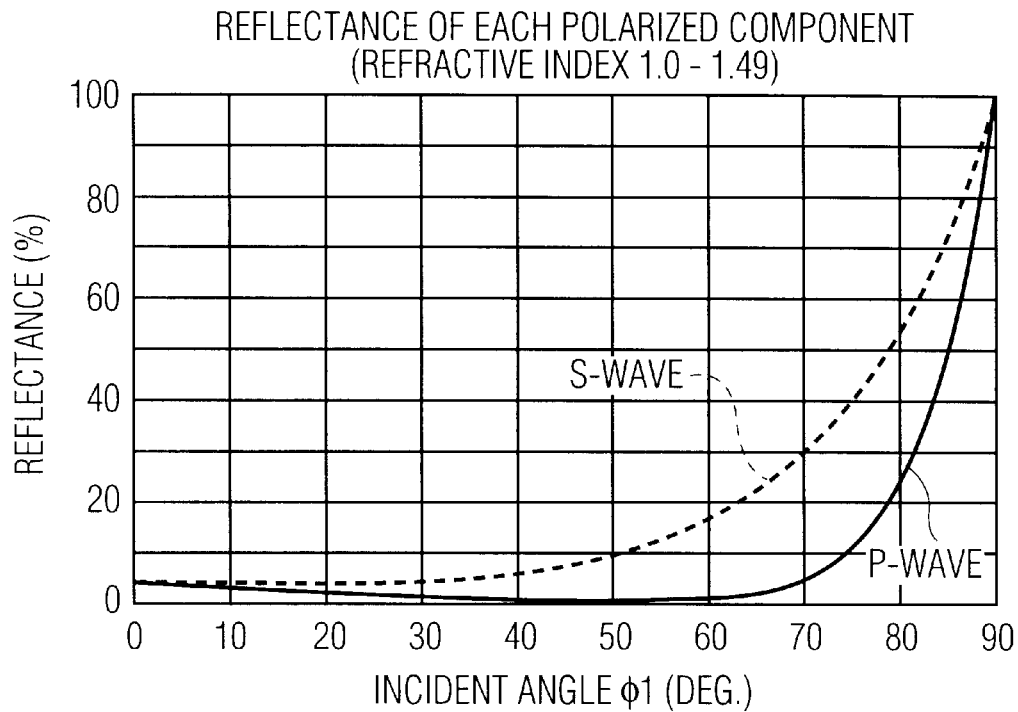
FIG. 17 is to illustrate a characteristic curve of reflectance observed when a ray of light enters a substance having a refractive index of 1.49 from a substance having a refractive index of 1.00.
Figure 18:
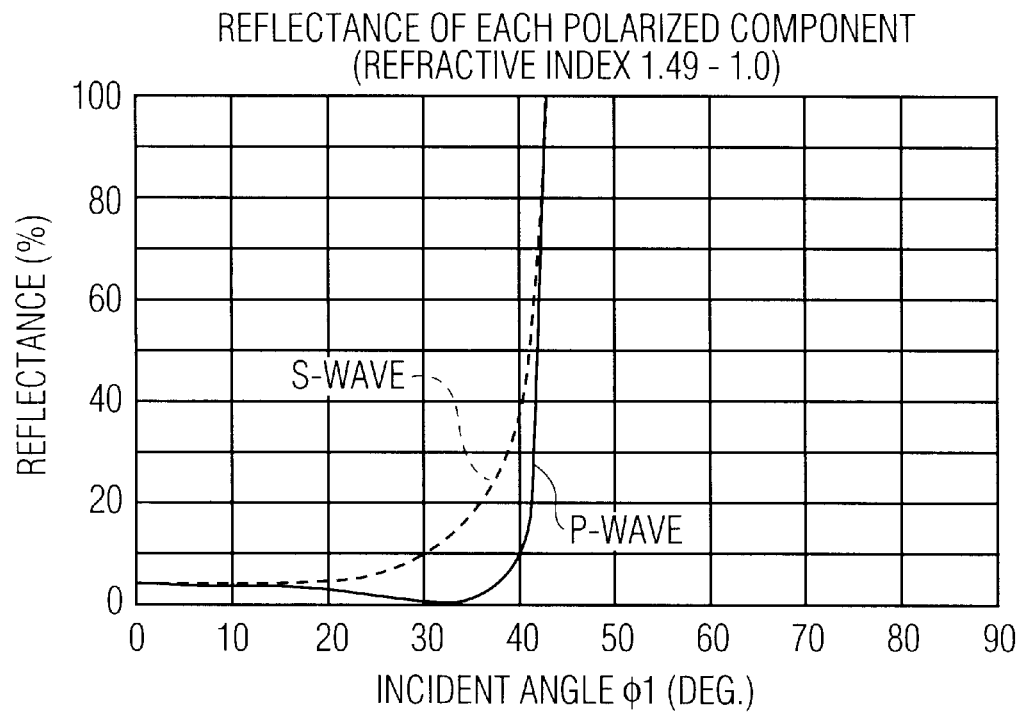
FIG. 18 is to illustrate a characteristic curve of reflectance observed when a ray of light enters a substance having a refractive index of 1.00 from a substance having a refractive index of 1.49.

As shown in FIGS. 17 and 18, a difference appears in refractive index between p-wave and s-wave polarized components depending on the incident angle $\phi_1$ and outgoing $\phi_2$ (the reflection/transmission characteristic for p-wave and s-wave polarized components differs). For example, when a ray of light goes from acryl of refractive index 1.49 to air of refractive index 1.00 (FIG. 18), the critical angle at which a total reflection occurs is 42.1 degree. Assuming a ray of light is incident at a smaller angle, 40 degree, an outgoing angle $\phi_2$ becomes 77.8 degree following Snell's raw. By substituting these values in the above introducing equation for Rs and Rp, the reflectance for s-wave and transmittance for p-wave are 35.69% and 7.98%, respectively.

And, the not reflected light transmits the light guide 202. the ratio of transmitted light is (100−35.69=64.31)% for s-wave and (100−7.98=92.02)% for p-wave, respectively. Thus, in FIG. 16, when incident light 204 comprising 100% of s-wave polarized component and 100% of p-wave component goes from acryl having a refractive index of 1.49 into air having a refractive index of 1.00 at an angle of 40 degree, the reflected light 205 has 35.69% of s-wave polarized component and 7.98% of p-wave polarized component, whereas the transmitted light 206 has 64.31% of s-wave polarized component and 92.02% of p-wave polarized component if no loss is caused in luminous energy due to a diffused reflection on the boundary surface, an internal absorption of light in the substances 1 and 2.

Figure 1:
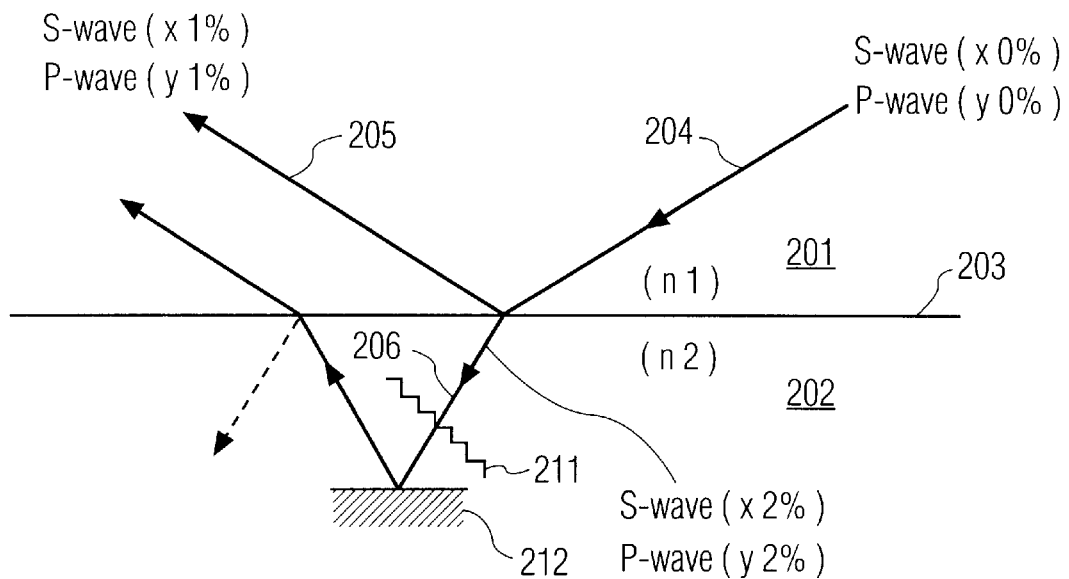
FIGS. 1 and 2 are to illustrate the structure of a polarization apparatus according to the present invention.

As shown in FIG. 1, a light polarizing device according to the present invention allows light 204 comprising a first polarized component and a second polarized component to enter the boundary 203 between the substance 20having a refracactive index of $n_1$ and the substance 202 having a refractive index of $n_2$, a part of light 205 to be reflected and another part of light 206 to transmit.

At that time, a reflected part of light 205 and another transmitted part of light 206 contain a first polarized component and a second polarized component at a different ratio on account of a difference in transmission/reflection characteristic as will be described later.

And, changing the polarization of light by means 211 for changing the polarization direction of the transmitted light 206 further changes the ratio of a first polarized component and a second polarized component in this transmitted light 206.

Furthermore, by means 212 for changing the traveling direction of light, the outgoing direction of this transmitted light 206 is changed into such a direction to enable both the reflected light 205 and the transmitted light 206 to be used. Thus, at least a part of the polarized component that has formerly not been made use of becomes usable and enhancing the light using efficient becomes possible.

Figure 2:
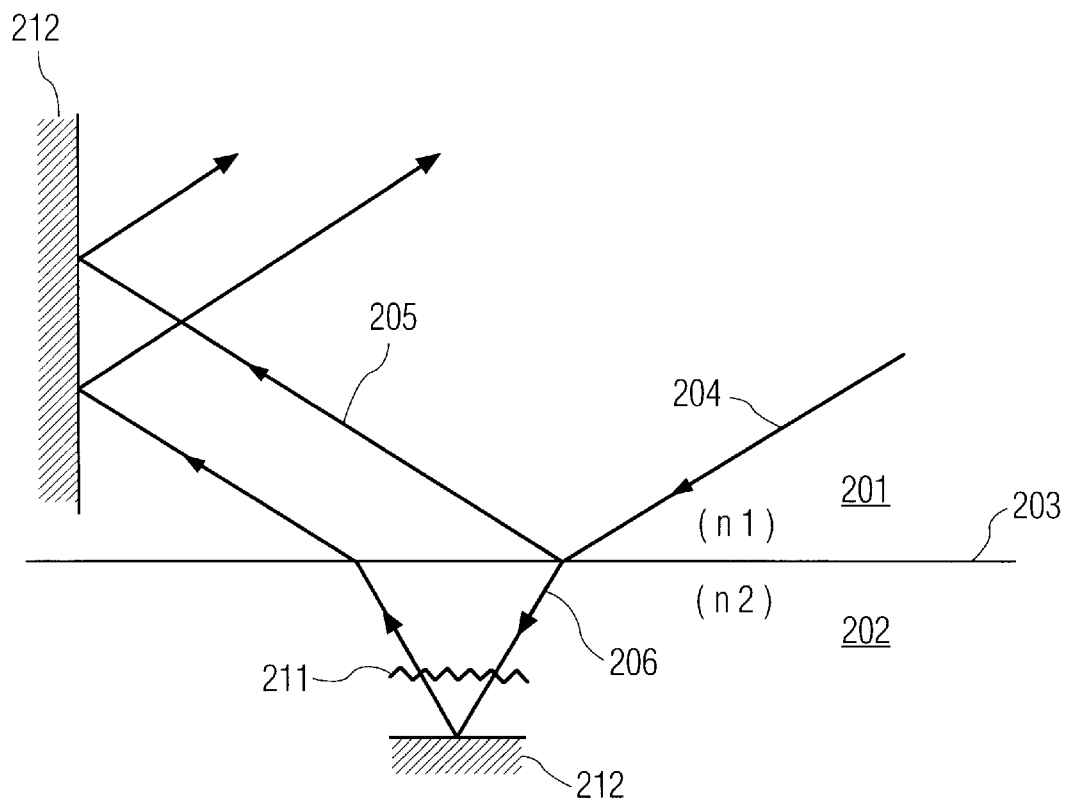

Here, as shown in FIG. 2, means 211 for changing the polarization direction of light and means 212 for changing the traveling direction of light may be situated on either side of a reflected part of light 205 or another transmitted part of light 206 because the feature for changing the polarization direction and the feature for changing the traveling direction of at least one of a reflected part of light 205 or another transmitted part of light 206 makes no difference on either side, and the order of arrangement is also optional. Thus, eight combinatorial cases are possible even when restricting means 211 for changing the polarization direction of light and means 212 for changing the traveling direction of light respectively to one.

In addition, it is also possible to change the polarization direction of both a reflected part of light 205 and another transmitted part of light 206 or to change the traveling direction of both, or to combine a plurality of means 211 for changing the polarization direction of light and means 212 for changing the traveling direction of light, and it is further possible to change the final direction or diffusion of outgoing light by selecting the refractive indices of substances 201 and 202, setting the incident angle, setting the angle and distance from the boundary surface of means 212 for changing the traveling direction of light. In such cases, innumerable combinations can be considered.

To describe concrete numerical values, for example, in the case of inverting the reflected light 205 in s-wave component and p-wave component by using a half wave plate (for the purpose of description, inverting is considered, but advantages of the present invention is achieved only by changing the ratio of polarized components, for example, through aides of a quarter wave plate) and reflecting the inverted light through a reflecting plate in such a manner as to vertically entering the boundary surface 203 (not shown), this light has 7.98% of s-wave component and 35.69% of p-wave component if an energy loss on the way of propagation ignored and accordingly 72.29% of s-wave component and 127.71% of p-wave component can be made use of in total if used together with the transmitted light 206, for the transmitted light comprises 64.31% of s-wave component and 92.02% of p-wave component. In contrast with the incident light 204 comprising 100% of s-wave component and 100% of p-wave component, more of p-wave polarized component can be made use of.

Means 211 for changing the polarization direction of light includes a phase plate for changing the phase, such as quarter wave plate or half wave plate, an optical rotator for rotating the plane of rotation, such as Faraday element, and the like. Converting s-wave component into p-wave component and vice versa can be made by passing through a half wave plate once like FIG. 1 or through a quarter wave plate twice like FIG. 2. Means 212 for changing the traveling direction of light includes a reflecting plate and prism sheet. Furthermore, means for changing the polarization direction of light and at the same time changing the traveling direction of light includes Fresnel's rhombic prism. Means 211 for changing the polarization direction of light and means 212 for changing the traveling direction of light in FIG. 2 can be replaced with one piece of Fresnel's rhombic prism having a particular reflection angle.

Figure 3:
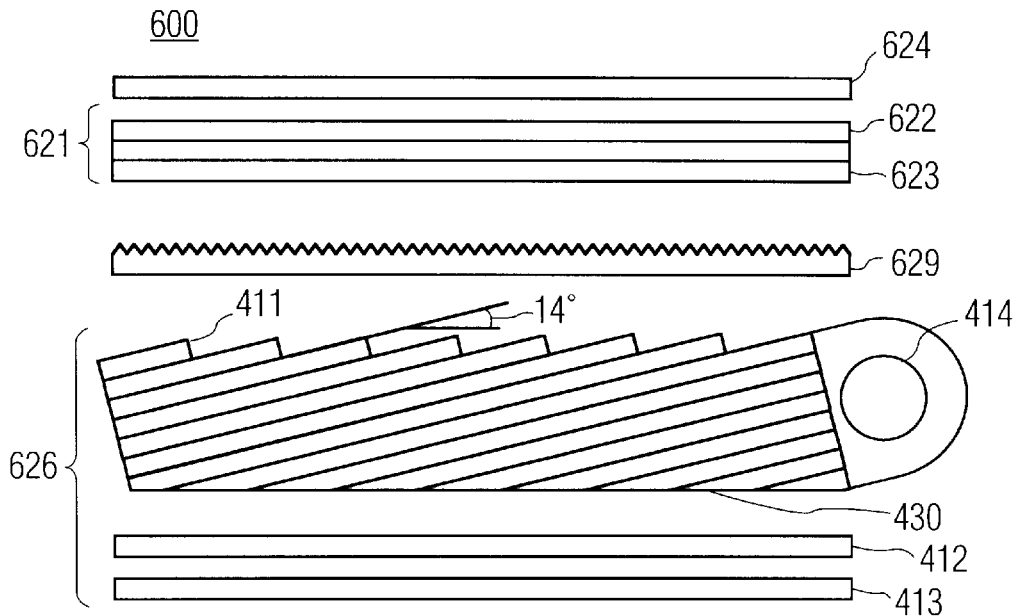
FIGS. 3 and 4 are to illustrate an LCD device according to the present invention.

FIG. 3 shows one embodiment of an LCD device according to the present invention. An LCD device 600 according to the present invention comprises a plurality of laminated light guides 411 having slant surfaces 401, a reflecting plate 413, and means 412 for changing the polarization direction of light. One embodiment of the present invention comprises an LCD glass panel 621, a polarizing plate 624 and a light guide unit 626, wherein the LCD glass panel 621 comprises two glass base plates 622 and 623 having peripheral edges sealed with edge seal 631, for example, made of epoxy resin and a liquid material is held between the glass base plates 622 and 623. The light guide unit 626 comprises a fluorescent lamp 414, a plurality of laminated light guides 411, a reflecting plate 413, a quarter wave plate 412 and a prism sheet 629.

Figure 5:
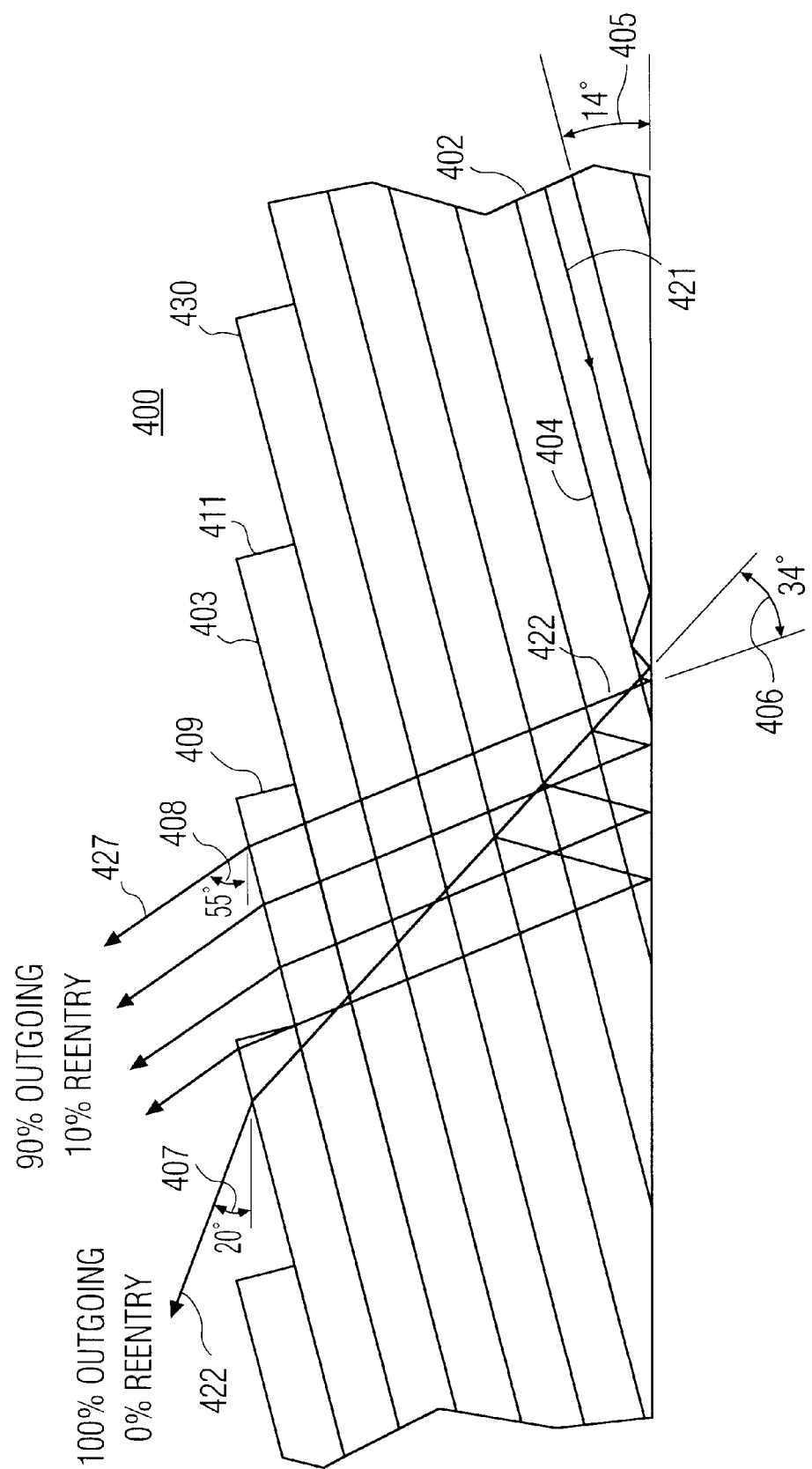
FIGS. 5 to 7 are to illustrate the structure of embodiments of light guide units according to the present invention.
Figure 6:
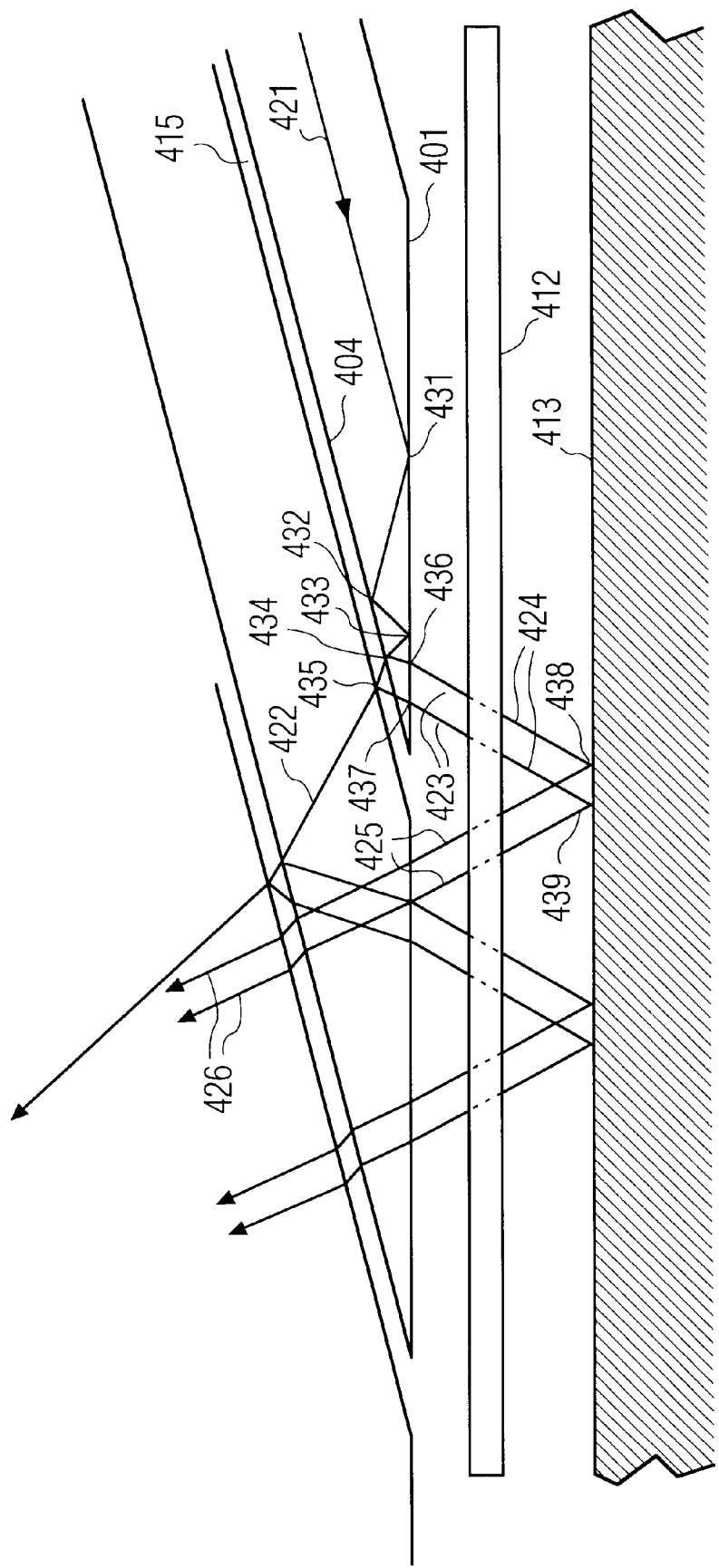

FIGS. 5 and 6 shows a preferred embodiment of a light guide unit according to the present invention. The light guide unit 400 comprises a main unit body 430 consisting of plurality of laminated light guides 411 and having an outgoing surface 403 on one side; a reflecting plate 413 disposed on the other side 401 of said main unit body 430; and means 412 disposed between the main unit body 430 and the reflecting plate 413 for changing the polarization direction of light.

The plurality of light guides 411 are laminated aslant the width direction of the main unit body 430 and are so arranged that light enters toward the end 401 on the side of the reflecting plate 413.

Here, the plurality of light guides 411 are preferably made of a material having a small decrease in optical packet on the reflecting surface, a low absorbency in the light guides and a large refractive index, such as acryl sheet, and can be replaced with a transmissive material, such as polycarbonate, polyethylene, Se and AgCl. The shape of a light guide is not limited to plate or sheet but can be modified to a shape fit for applications, such as rod-like light guide or curved surface light guide. And, the plurality of light guides are not limited to the same shape or material, but can be thought to be so designed as thick for a member requiring strength and as thin for a member requiring no strength, or to increase in the number of laminated layers while maintaining the strength by depositing multiple layers of material different in refractive index on a light guide of high strength. When using acryl sheets as light guides, the width is preferably 0.1 to 4.0 mm from the standpoint of strength and light using efficiency.

Incidentally, lamination referred to as in the present invention is not limited to the insertion of air between the light guides, and implies the insertion of water or adhesive or other substances different in refractive index from a light guide for preventing the deterioration of a light guide due to invasion of moisture or the peeling of a light guide.

A reflecting plate according to the present invention is the more preferable if higher in reflectance, and aluminum deposit sheet, silver deposit sheet, metal foil and the like can be made mention of as preferable.

The most preferred embodiment of a light guide unit according to the present invention has a light source 414 on the side of end 402 and allows a ray of light to enter one and more of a plural of light guide 41 1 toward surface 401.

Figure 8:
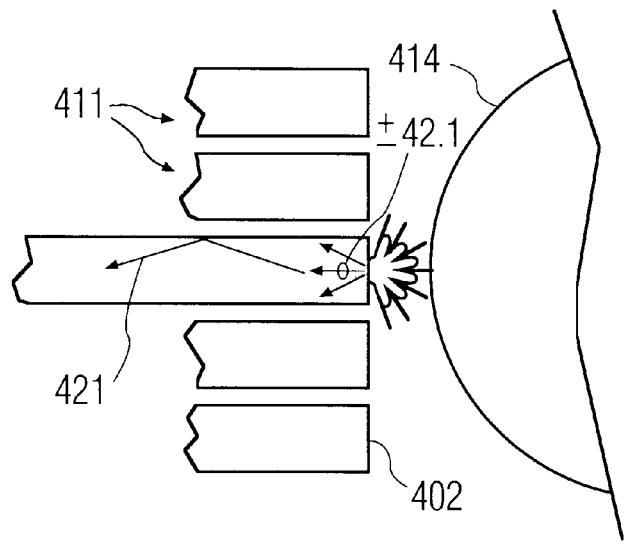
FIG. 8 is to illustrate the incidence of light on the end face of a light guide unit according to the present invention.

FIG. 8 shows the entering and flow of light on the end face 402. Light emitted from a fluorescent lamp (light source) 414 enters a light guide from the light guide edge.

Though rays of light enter the end face of a light guide from all angles, the rays of light after the incidence goes within ±42.1 degree following Snell's law. At the point 434 in FIG. 6 mentioned later, it is preferable to make an incident light 421 enter the surface 404 at a Brewster's angle and accordingly the light using efficiency can be enhanced by converging the incident light 421 in parallel. Means for converging such light includes converging means by using a lens or convex mirror, by making the end face 402 for the incidence of light in a light guide into a shape of convex lens, or by combining these.

Since light guides 411 are separated with a thin air layer 415 each from other, a ray of light in a light guide causes a total reflection in accordance with the relation of light guide refractive index n=1.49>air refractive index n=1.0 at incident angles above the critical angle and propagate to the light guide edge without loss, as shown in FIG. 8, even if there is no converging means. Because of repeating a total reflection, the incident light 421 has no polarization at this point. For a slant angle of 14 deg. shown in the embodiment, after repeating a total reflection against the wedge portion (FIG. 6 should be referred to) of the light guide edge three times at the points 431, 432 and 433, the incident angle becomes smaller than the critical angle (the incident angle decreases with smaller slant angle of a light guide) and thus outgoes at the point of 434 outside the light guide 411.

Figure 9:
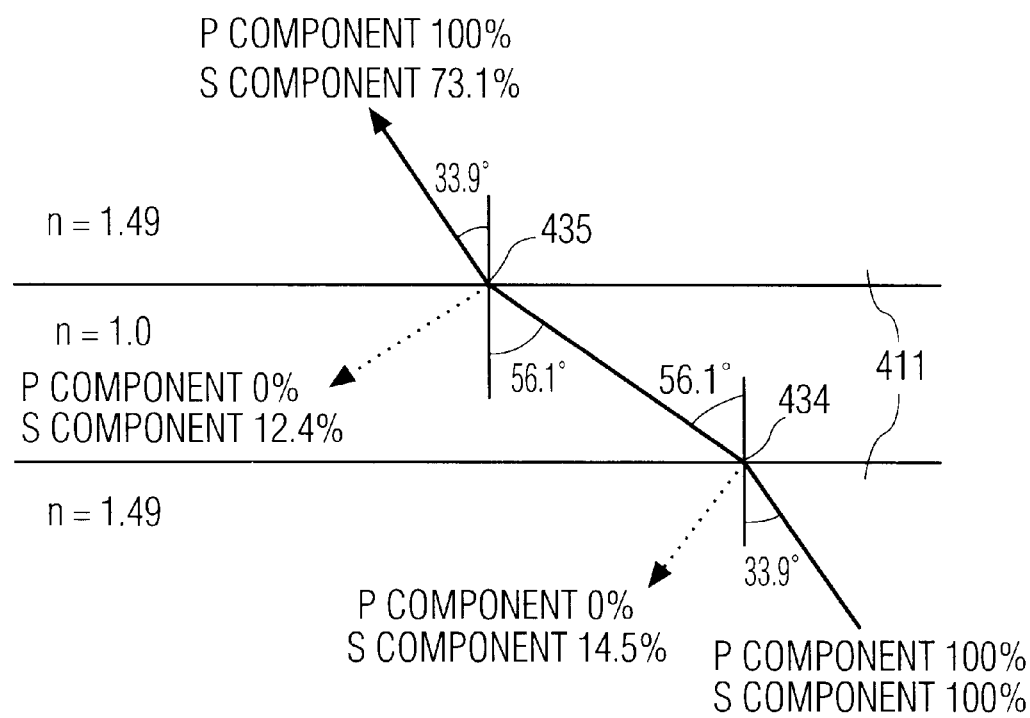
FIG. 9 is to illustrate the reflectance and transmittance observed when a ray of light enters a substance having a refractive index of 1.49 from a substance having a refractive index of 1.00 at a Brewster's angle.

As shown in FIG. 9, for an incident angle of 33.9 deg. at this point 434, the reflectance of p-wave becomes 0. Also for the incidence from an air layer into a light guide, the reflectance of p-wave becomes 0 at an incident angle of 56.1 deg. and this angle is called Brewster's angle. The reflectance of s-wave at the Brewster's angle is 14.5%. When a ray of light enters air of refractive index n=1.00 from a light guide 411 of refractive index n=1.49 at the incidence angle of 33.9 deg., the refractive angle becomes 56.1 deg. in accordance with Snell's raw. This angle is coincident with the Brewster's angle at the outgoing from air the a substance of refractive index n=1.49.

As seen from FIGS. 17 and 18, transmittance of p-wave at this time becomes (100−0)×(100−0)=100%, i.e. 100% of p-wave transmits, whereas only (100−14.5)×(100−14.5)=73.1% of s-wave transmits. Thus, every time when a first outgoing light 422 in FIG. 5 passes through one piece of light guide 411, only 73.1% of s-wave transmits and (14.5+12.4)% is reflected, whereas 100% of p-wave transmits. While passing through plate-like light guiding plates one after another, only s-wave repeats the reflection and the transmitted light increases the degree of polarization.

When a first outgoing light 422 outgoes from the upper surface (outgoing surface) 403 after passing through about 10 layers of light guiding plates, the final transmittance at this point is $(1.00)^{10}$=100% for p-wave and $(0.73)^{10}$=4% for s-wave. In the case of putting the thickness of a light guide into halves and using 20 laminated layers, the transmittance of s-wave can be reduced down to $(0.73)^{20}$=0.2%. In this way, by making the thickness of a light guiding plate thinner and increasing the number of laminated layers, the degree of polarization can be increased, but the thickness of a light guiding plate is preferably 0.1 mm to 4.0 mm from the standpoint of strength in light guiding plate when employing acryl sheets as light waves. In addition, when inserting an air layer between one light guide and another light guide, it is preferable to make this air layer as thin as possible and also the light guides are preferably made up of a somewhat rigid material.

When converging the incident light 421 into parallel rays, a geometrical analysis reveals the light guides 411 must slant by the following α[rad] to make the incident angle at the point 434 coincident with a Brewster's angle, where a: $(\pi/2-\Theta_1)/2m$;

$\Theta_1$: Brewster's angle at the incidence from a substance of refractive index $n_1$ to a substance of refractive index $n_2$ (=arcsin$\sqrt{(n_2^2/(n_1^2+n_2^2))}$);

$n_1$: refractive index of a substance between the light guides; and $n_2$: refractive index of the light guides.

Here, m represents a natural number equal to or more than 1. When the incident light 421 is not totally reflected at the point 434 but part of light transmits, since light containing much of p-wave component transmits as shown in FIG. 17, the utilizing efficiency of light becomes worse for a process of conversion into light containing much of s-wave component by a later-mentioned means for changing the polarization direction of light (quarter wave plate) 412. Also when not totally reflected at the point 432, the utilizing efficiency of light lowers. Thus, considering the relation with the critical angle in which the incident light 421 is totally reflected, m is preferably set as follows:

$m<(\pi/2-\Theta_1)/(\Theta_2-\Theta_1)$, where $\Theta_2$: critical angle at the incidence from a substance of refractive index $n_1$ to a substance of refractive index $n_2$ (=arcsin $(n_2/n_1)$).

Figure 7:
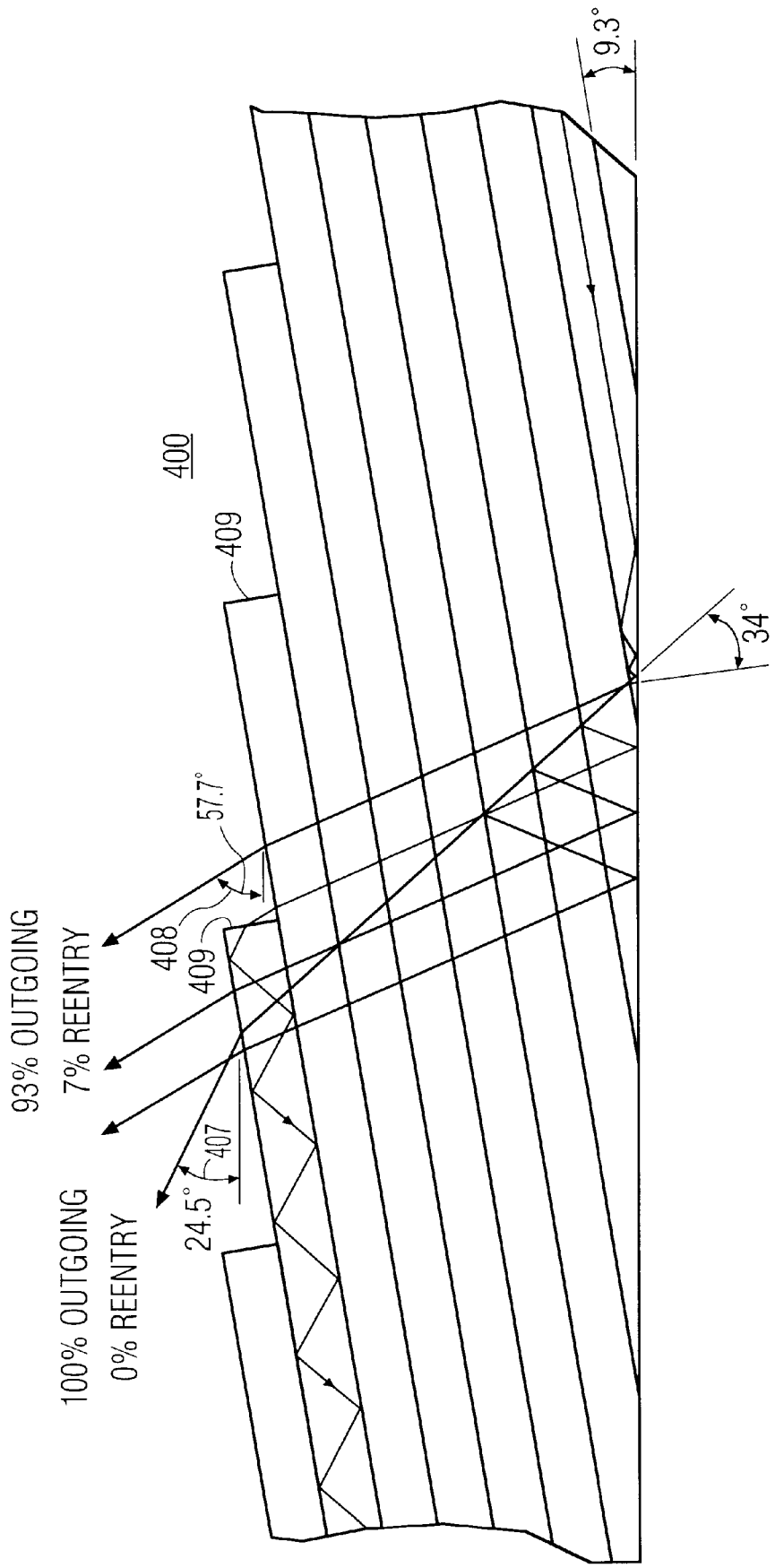

When setting this m to a large value, there are advantages in that the outgoing surface 403 opposed to the end face 402 can be set to a wide area and a thinner light guide unit can be achieved, whereas there is a demerit in requiring labors for machining. Incidentally, light guides in the embodiment are made of acryl sheets having a refractive index of 1.49. In the case of lamination in air having a refractive index of 1.00, the slant angle of light guides is preferably set to 28/m deg. FIG. 7 shows one embodiment for m=3 and slant angle 405=9.3 deg.

However, machining the slant angle α of a light guide 411 to $(\pi/2-\Theta_1)/2$ m is difficult actually in many cases. If the reflectance of p-wave component of a first out going light 422 is equal to or less than 0.1% in each layer, only 2% of loss is yielded by the relation $(0.999)^{20}$=0.980 after passing through 20 layers and therefore there are few problems. Since the tolerance of an incident angle for 0.1% or less of reflectance of p-wave component at he point 434 is ±3 deg., the tolerance of a slant angle in a light guide is regarded as 3/2 m [deg] (=π/120 m [rad]).

Now, with respect to reflected s-wave, because a geometrical relation between the reflected s-wave and light guides is not greater than the critical angle, the s-wave reflected from each layer of light guide goes toward the bottom face 401. This ray of light 423 passes through a quarter wave plate 412, one of means for changing the polarization direction of light, is reflected from a reflecting plate 413, and further again passes through the quarter wave plate 412. In this way, by passing through the quarter wave plate 412 twice, the phase shifts by a half wavelength in total and the s-wave is converted into the p-wave. Then, the reflected light 425 enters the light guide 411 again and outgoes from the outgoing surface 403 as a second outgoing light 427. If viewed as a light guide unit, the light outgoing from the outgoing surface consists almost of p-wave component and making the polarization axis of light in the light guide unit coincident with the polarization axis of liquid crystals enables at least part of the light that has formerly not been utilized to be utilized, and thus promoting the utilizing efficiency of light has become possible.

Figure 4:
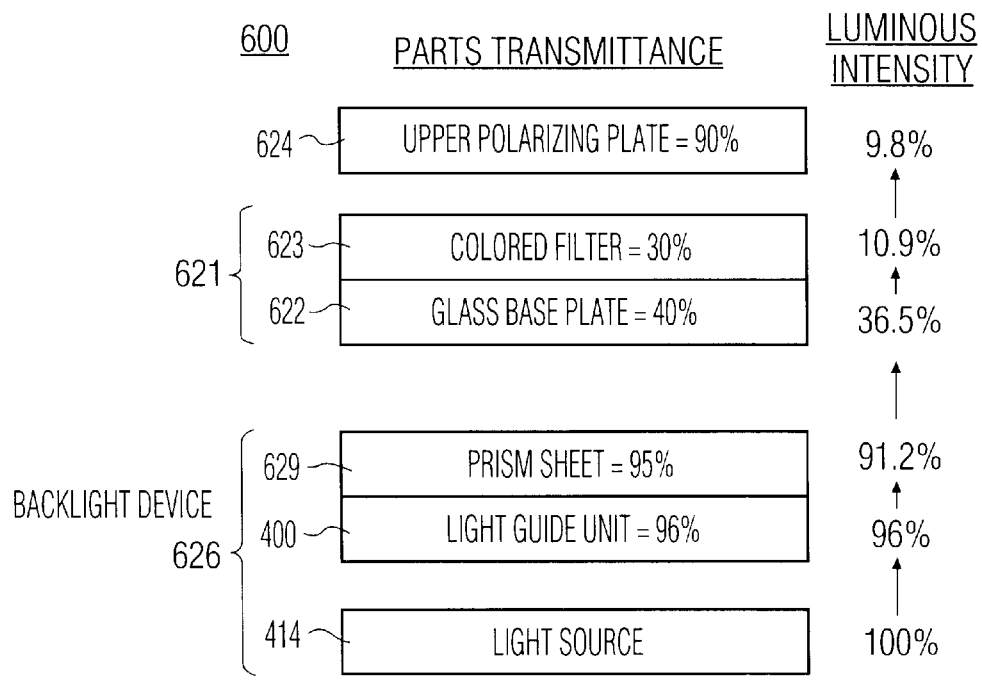
Figure 15:
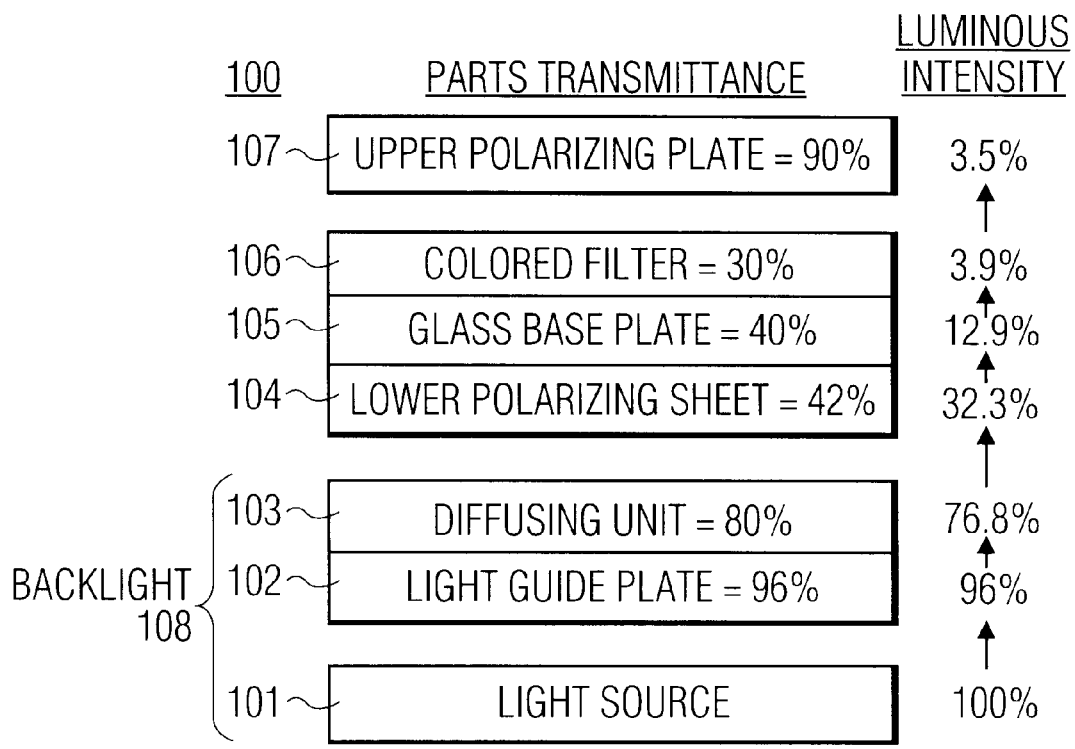
FIG. 15 is to illustrate a conventional LCD device.

In an LCD device according to one embodiment of the present invention, as shown in module 600 in FIG. 4, our measurements on the light generated in the light source 414 reveal that the transmittance is approx. 96% in the light guide unit 400 and approx. 95% in the prism sheet 629 (there is no lower polarizing plate) and the array opening ratio is approx. 40% in the glass base plates 622, the transmittance is approx. 30% in the color filter 628 and approx. 90% in the upper polarizing plate 624. Thus, 9.8% of light generated in the light source 414 becomes utilizable and light utilizability increased indeed to be 2.8 times in comparison with the former utilizability of 3.5% shown in FIG. 15.

Incidentally, as shown in FIGS. 5 to 7, an aspect of a plurality of light guides 411 with the end 401 of the reflecting plate side equally cut to one plane was described, but another aspect is also possible in which a plurality of light guides 411 have no such shape and the main light guide unit is made up of commercially available acryl sheets having rectangular corners. In such a case, the wedge-shaped portion shown in FIG. 6 comprises an air layer. When the incident light 412 is made to outgo from the light guide 411 to the wedge-shaped air layer, part of light is reflected from the boundary surface. If the incident light is not completely parallel rays, since the refractive index of the light guide>that of air layer at the time of outgoing from the light guide 411, diffusion of light may occur when the light outgoes from the light guide 411 to the air layer. Furthermore, the reflection of s-wave component at the point 434 shown in FIG. 6 disappears. Like this, when selecting such a configuration, the utilizing efficiency of light lowers but there is a benefit in that machining becomes very easy.

When applying a light guide unit according to the present invention to an actual LCD device, the first outgoing light 422 forms an angle of 20 deg. and the second outgoing light 427 forms an angle of 55 deg. for the type of a slant angle, 14 deg. in FIG. 5, whereas the first outgoing light 422 forms an angle of 24.5 deg. and the second outgoing light 427 forms an angle of 57.7 deg. for the type of a slant angle, 9.3 deg. in FIG. 7. For implementing a thinner LCD device, the direction of light must be corrected so that these directions 422 and 427 may be vertical to the outgoing surface 403.

As such methods, a method for disposing a prism sheet on the outgoing surface or a method for machining a groove on the outgoing surface itself can be thought of.

Figure 10:
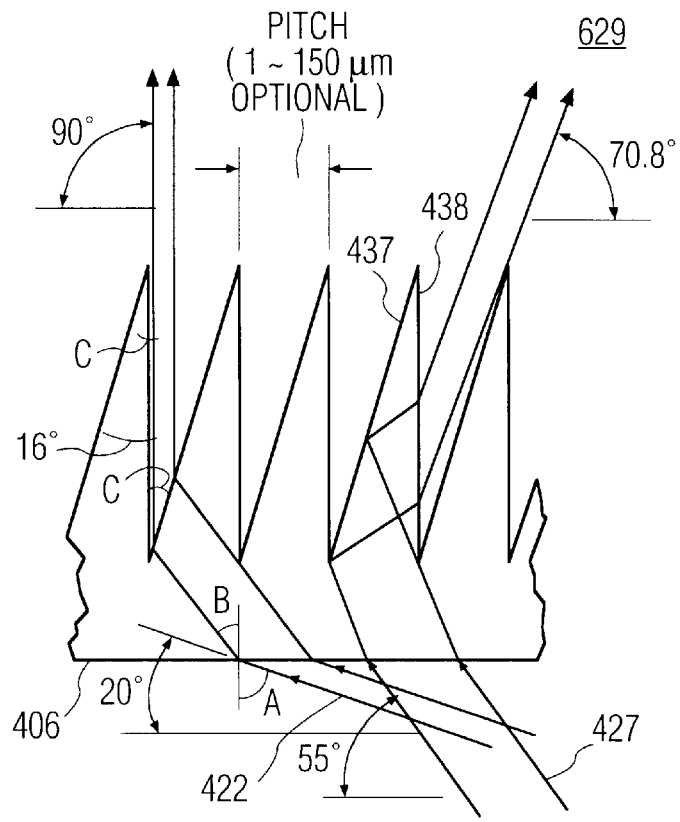
FIGS. 10 to 12 are to illustrate the structure of a prism sheet according to the present invention.
Figure 11:
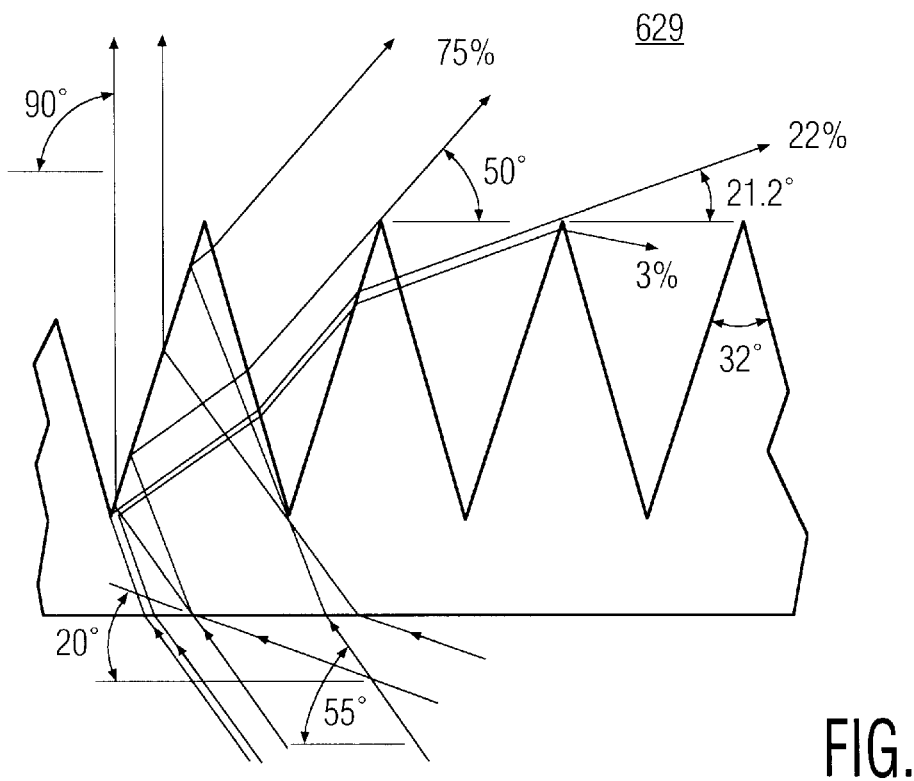
Figure 12:
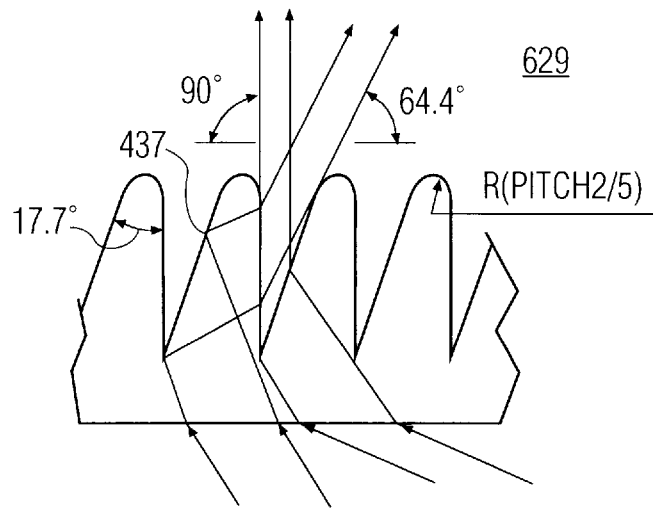

FIGS. 10 to 12 show examples of correcting the outgoing direction of light by using a prism sheet.

FIGS. 10 and 11 show the case of the slant angle in a light guide being 14 deg., whereas FIG. 12 shows the case of the slant angle in a light guide being 9.3 deg.

As shown in FIG. 10, a first outgoing light 422 from the outgoing surface 403 of the light guide unit 400 enters the bottom surface 406 of a prism sheet. Letting A be an incident angle at this time, this incident angle A is slant against an incident angle (equal to a Brewster's angle for the most preferred embodiment) at the point 434 in FIG. 6 by the slant angle α of the light guides 411.

Thus, A can be represented as:

$$A = \arcsin(n_1 \sin \Theta_1) + \alpha.$$

Then, letting $n_3$ be the refractive index of this prism sheet, the outgoing angle B to the prism sheet can be represented in accordance with Snell's law as:

$$B = \arcsin(\sin A/n_3).$$

And, the top angle C of a prism sheet having two side of a rectangular triangle for making this light refract in the direction vertical to the outgoing surface 403 of the light guide unit 400 and outgo is determined in accordance with Snell's law as:

$$n_3 \times \sin((\pi/2) - B - C) = 1 \times \sin((\pi/2) - C)$$

and therefore $$C = \arctan((n_3 \times \cos B - 1)/\sin A)$$

or, on eliminating B, $$C = \arctan((n_3 \cos(\sin^{-1}(\sin A/n_3)) - 1)/\sin A)$$

Furthermore, for a prism in a shape of isosceles triangle shown in FIG. 11, it seems clear that the outgoing light 422 can be directed to the directed vertical to the outgoing surface 403 by setting this top angle to double the top angle of the rectangular triangle. Incidentally, as shown in FIG. 11, for a prism sheet with the top angle between two side of a isosceles triangle, there is a demerit in that the outgoing light further is highly probable to enter the adjacent vertex, but there are advantages in that the yield is good and the production cost is low. In addition, since correcting the direction of an outgoing light is performed on the slant 437, the top angle of a rectangular or isosceles triangle may be a curved line as shown in FIG. 12.

Incidentally, even if this corrected outgoing light does not exactly form a rectangle to the outgoing surface 403, the slant of the order of ±2 deg. is insignificant to the human eye and thus the top of a prism sheet has a tolerance of ±2 deg. (π/90 [rad]) for between two sides of a rectangular triangle and a tolerance of ±4 deg. (π/45 [rad]) for an isosceles triangle.

Meanwhile, a design value for a prism sheet was shown in the present embodiment, but it can be done by those skilled in the art to apply this value to a groove machined on the outgoing surface itself and to identify the shape of such a groove.

Refer to FIGS. 5 and 6 again. Since the reflecting plate 413 is arranged in parallel with the surface 401 as shown in FIGS. 5 and 6, the outgoing angle 407 of a first outgoing light 422 and that 408 of a second outgoing light 427 is 20 deg. and 55 deg. respectively for the type of slant angle, 14 deg. in FIG. 5, whereas the outgoing angle 407 of a first outgoing light 422 and that 408 of a second outgoing light 427 is 24.5 deg. and 57.7 deg. respectively for the type of slant angle, 9.3 deg. in FIG. 7. Thus, even when outgoing from the outgoing surface 403 (423) and converted into a p-wave component by means of a quarter wave plate, some amount of loss occurs actually because the second outgoing light 427 does not enter a light guide 411 at a Brewster's angle.

There seem to be many cases where it is desirable to utilize a first light 422 and a second light 427 in the same direction. For this object, the utilizing efficiency of light can be raised with approaching of the outgoing angle 408 of a second outgoing direction 427 to the outgoing angle 407 of a first outgoing direction 422 by correcting the direction of reflection through aids of the reflecting plate. However, it is impossible to set the outgoing angle 408 of a second outgoing direction 427 and the outgoing angle 407 of a first outgoing direction 422 equal to each other by such means alone. This is because the light 425 reflected from the bottom face 401 does not transmit through a light guide 411 but is totally reflected on account of slant arrangement of light guides.

To solve these problems, it is also possible to laminate substances different in refractive index, make a ray stepwise refracted and cause the ray to enter the bottom face 401 (not shown). Incidentally, means for correcting the outgoing angle 408 of a second outgoing light 427 are not only means by slanting a reflecting plate but also by using a Fresnel's rhombic prism for changing the angle in outgoing and by using a prism sheet. In conjunction to slanting this reflecting plate, it is also thought of to make this plate into a stepwise shape for space-saving.

Now, the shape of the outgoing surface of a light guide will be considered. If the shape of surface 409 is vertical like FIG. 7, the outgoing light comes to enter light guides again, and accordingly the utilizing efficiency of light lowers. Thus, it is preferable to cut the surface 409 in conformity to the outgoing angle 407 of a first outgoing light.

Figure 13:
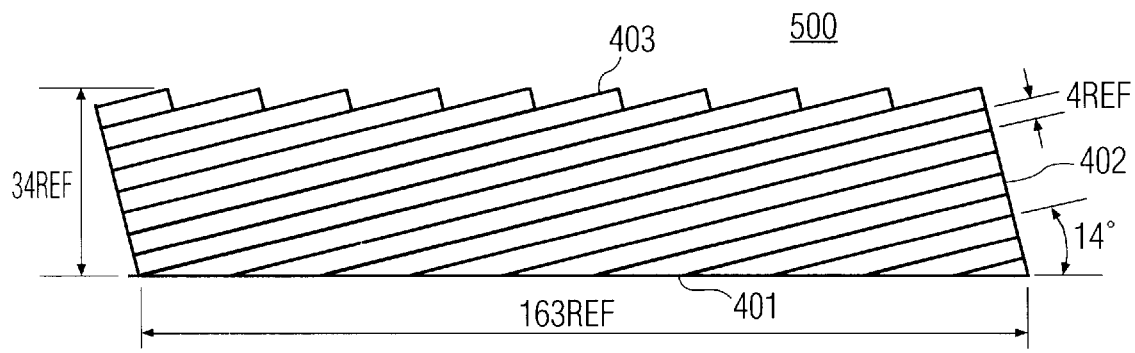
FIGS. 13 and 14 are to illustrate a light guide unit according to the present invention.
Figure 14:
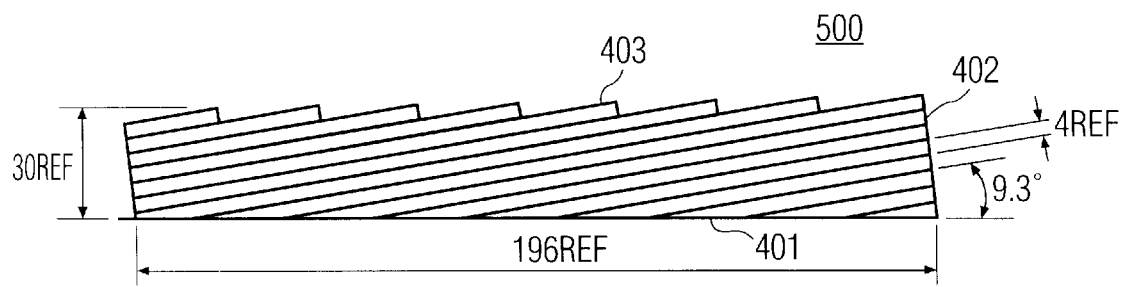

Another aspect of the present invention will be described. As shown in FIGS. 13 and 14, a light guide unit according to the present aspect has much the same shape as that of the above light guide unit 400, but differs in comprising neither reflecting plate nor means for changing the polarization direction of light and in the requirements that the end 401 of the reflecting plate side is equally cut to a plane and the slant angle of light guides is made to correspond to a Brewster's angle.

Since such a configuration alone enables a first outgoing light 422 shown in FIG. 5 to be utilized and the slant angle of a light guide (angle in which the light 421 comprising both a first and second polarized components first enters) is set to be smaller than the angle of light guides in a conventional transmissive linear polarizer, this aspect has a significant advantage in that the light 422 comprising more of a first polarized component than a second polarized component can be diffused over a wider outgoing surface than a conventional transmissive linear polarizer for outgoing (reversely, it is also possible to make a ray of light enter from the outgoing surface and to converge the ray for outgoing). Incidentally, it would be in need of no description that the shape of this light guide unit 500 has a property similar to that of the above light guide unit 400.

Also concerning another aspect of the present invention, it is not essential to equally cut the surface 401 to a plane as with the above light guide unit 400, but a reflecting plate constitutes an essential constituent in such a case. At this time, the wedge-shaped portion shown in FIG. 6 comes to comprise an air layer as described in the light guide unit 400, but when the incident light 421 outgoes from the light guides 411 to a wedge-shaped air layer, part of the light is reflected from the boundary. Unless the incident light is completely parallel rays, since (the refractive index of the light guide) >(that of air layer at the time of outgoing from the light guide 411), diffusion of light may occur when the light outgoes from the light guide 411 to the air layer. In addition, the reflection of s-wave component at the point 434 shown in FIG. 6 disappears. Like this, when selecting such a configuration, the utilizing efficiency of light lowers but there is a benefit in that machining becomes very easy.

As above, the present invention achieves the utilizing efficiency of light close to 100% by converting the polarized component that has formerly been absorbed in a polarizing plate for obtaining the polarization into the target polarized component, and thus can provide a backlight system of low power consumption and high brightness.

Also, the present invention solves the problems of heat from a polarizing plate that has formerly been generated, and thus can provide a backlight system least likely to deteriorate in parts, coping with a thermolabile LCD device.

And, the present invention enables a LCD device to be constructed without using a lower polarizing plate that has formerly been an essential constituent thereof.

Furthermore, the present invention can provide a light guide unit enabling a converged ray of light to diffuse onto a wide outgoing surface for outgoing, or a wide ray of light to outgo toward a converged outgoing surface and at the same time a constant polarized component to be obtained.

I claim:

1. An apparatus for increasing either a first or second polarized light component, comprising:

a laminated light guide having an edge surface for receiving incident light having first and second oppositely polarized light components into a multiplicity of light guide laminations, the laminations of the laminated light guide guiding said received light and forming a multiplicity of boundary surfaces between laminations for directing the first polarized light component primarily into a first direction and for directing the second polarized light component primarily into a second direction;

means for changing the polarization direction of light traveling in the first direction into opposite polarization while not changing the polarization direction of light traveling in the second direction means for changing the traveling direction of the light traveling in either the first or second direction so as to combine the light traveling in the first and second directions for use together.

2. The apparatus as set forth in claim 1 wherein said means for changing the polarization direction of light is a phase plate and said means for changing the traveling direction of light is a reflecting plate.

3. A light polarizing method comprising the steps of:

allowing light comprising first and second oppositely polarized components to enter a multiplicity of laminations of a laminated light guide through an edge thereof, the laminations of the light guide guiding said light within said laminations and forming a multiplicity of boundary surfaces between two substances mutually different in refractive index, a part of the light being directed by the multiplicity of boundary surfaces of the laminated light guide into a first direction and another part of the light being directed by the multiplicity of boundary surfaces of the laminated light guide into a second direction, the light directed into the first direction primarily being the first polarized component and the light directed into the second direction primarily being the second polarized component;

changing the polarization direction of the light traveling in the first direction; and changing the traveling direction of the light traveling either in the first or the second direction so as to combine the light traveling in the first and second directions for use together.

4. A liquid crystal display comprising:

a light source having first and second oppositely polarized components;

a laminated light guide unit having a multiplicity of laminations for receiving light from the light source into an edge thereof and for guiding said light within said laminations, said laminations of said laminated light guide forming multiple boundary surfaces for directing light into first and second directions, the light directed into the first direction being primarily the first polarization component and the light directed into the second direction being primarily the second polarization component;

glass base plates for sandwiching liquid crystals; and an upper polarizing plate; wherein said light guide unit further comprises:
means for changing the polarization direction of the light traveling in the first direction; and
means for changing the traveling direction of the light traveling either in the first or second direction to combine the light traveling in the first and second directions for use together.

* * * * *